US008283604B2

(12) United States Patent
Erber et al.

(10) Patent No.: US 8,283,604 B2
(45) Date of Patent: Oct. 9, 2012

(54) CHIP WARMER

(75) Inventors: Jeffrey S. Erber, Edwardsville, IL (US); Kimberly B. Aaron, Wauconda, IL (US)

(73) Assignee: Carter Hoffmann, Inc., Mundelein, IL (US)

( * ) Notice: Subject to any disclaimer, the term of this patent is extended or adjusted under 35 U.S.C. 154(b) by 700 days.

(21) Appl. No.: 11/992,005

(22) PCT Filed: Aug. 22, 2006

(86) PCT No.: PCT/US2006/032963

§ 371 (c)(1), (2), (4) Date: Sep. 9, 2009

(87) PCT Pub. No.: WO2007/037855

PCT Pub. Date: Apr. 5, 2007

(65) Prior Publication Data

US 2009/0321409 A1 Dec. 31, 2009

(51) Int. Cl.
*A47J 39/02* (2006.01)

(52) U.S. Cl. .......... 219/385; 219/214; 219/386; 99/483; 222/146.5

(58) Field of Classification Search ........................ None
See application file for complete search history.

(56) References Cited

U.S. PATENT DOCUMENTS 2,248,633 A * 7/1941 Lee .................................. 34/88
2,458,190 A * 1/1949 Newburger .................. 219/214
2,529,877 A * 11/1950 Ladge .............................. 34/88
2,844,704 A * 7/1958 Kennedy ...................... 219/479
3,134,510 A * 5/1964 Cretors ......................... 222/156
4,776,317 A * 10/1988 Pinnow et al. ............. 126/37 R
4,803,921 A * 2/1989 Nuss .............................. 99/483
4,850,120 A * 7/1989 Stein ................................ 34/88
5,368,093 A 11/1994 Takehashi ....................... 165/46
5,505,009 A * 4/1996 Stein et al. ...................... 34/543
2001/0042743 A1* 11/2001 Faries et al. .................. 219/400
2008/0098907 A1* 5/2008 Peters et al. ................... 99/483

OTHER PUBLICATIONS

International Search Report issued Jul. 5, 2007 for the corresponding International Application PCT/US2006/032963.
Written Opinion for related PCT/US2006/032963 dated Jul. 5, 2007.
International Preliminary Report on Patentability for related PCT/US2006/032963 dated Mar. 18, 2008.
International Preliminary Examination Report for related PCT/US2006/032963 dated Feb. 23, 2010.

* cited by examiner

*Primary Examiner* — Joseph M Pelham
(74) *Attorney, Agent, or Firm* — Brinks Hofer Gilson & Lione

(57) ABSTRACT

A chip warming device (10, 1000, 2000) is provided with a support structure (15) and a heating device. The support structure (15) has a first door (100) that selectively seals a first opening (60), a second door (110) that selectively seals a second opening (70) and a chip tray (120) that selectively seals a third opening (80). The heating device is positioned in the support structure (15) that supplies heat to the chips. The first and second openings (60, 70) are adjacent to each other. The second door (110) can be at an angle with respect to vertical when in a closed position. The chip tray (120) can be at an angle with respect to vertical when in a closed position. The support structure (15) can have a floor that is at an angle with respect to horizontal. An antimicrobial coating or treatment can be used on at least a portion of the support structure (15) for suppression of microbe growth.

16 Claims, 8 Drawing Sheets

10 100 40 300 25 110 15 150 120 20 140

60 25 117 100 40 112 300 70 110 115 150 210 20 120 200 112 80

2000
2200
2100

2000

CHIP WARMER

BACKGROUND OF THE INVENTION

1. Field of the Invention

This invention generally relates to food warming and, more particularly, to an apparatus for warming chips.

2. Description of the Related Art

Chip warming devices are used to heat chips, such as nacho chips. The contemporary chip warming devices often include numerous parts, which increase the cost of manufacture. Additionally, such devices are often difficult to load. Where a large amount of chips are being warmed or the device is being frequently used, this difficulty in loading can result in a large expenditure of time and labor.

Accordingly, there is a need for a chip warming device that reduces the cost of manufacture of the device. There is a further need for a chip warming device that facilitates its use, including the loading and unloading of chips therein.

SUMMARY OF THE INVENTION

In an exemplary embodiment, a warming device for chips is provided comprising a support structure and a heating device. The support structure defines an inner volume and has a first door selectively sealing a first opening, a second door selectively sealing a second opening and a chip tray selectively sealing a third opening. The heating device is positioned in the support structure that supplies heat to the chips in the inner volume. The first and second openings are adjacent to each other.

In another aspect, a warming device for chips is provided comprising a support structure, a heating device and an antimicrobial coating. The support structure defines an inner volume and has a chip tray selectively sealing a first opening. The heating device is positioned in the support structure that supplies heat to the chips in the inner volume. The antimicrobial coating is on at least a portion of the chip tray.

In another aspect, a method of warming chips is provided that comprises heating a selectively sealable inner volume of a support structure that contains the chips; providing access to the inner volume via at least two openings; selectively sealing at least one of the at least two openings via a plurality of doors; and moving the chips towards at least one of the at least two openings.

The second door can be rotatably mounted to the support structure. The second door may be at an angle with respect to vertical when in a closed position. The chip tray can be rotatably mounted to the support structure. The chip tray can be at an angle with respect to vertical when in a closed position. The support structure can have a floor that is at an angle with respect to horizontal. The second door can comprise a front panel and side panels that are substantially perpendicular to the front panel. The side panels may be positioned in the inner volume when the second door is in a closed position. Each of the side panels can have a slot formed therein that cooperates with pivots of the support structure for guiding the second door. The first door may be rotatably mounted to the support structure. The first door can be substantially horizontal when in a closed position.

The device can further comprise an antimicrobial coating on at least a portion of the support structure. The antimicrobial coating may be positioned along at least one of the first door, the second door and the chip tray. The device can further comprise an antimicrobial coating on at least a portion of the floor of the support structure. The heating device may be positioned in a portion of the support structure opposite to the third opening.

The support structure can have first and second doors that selectively provide access to the inner volume, with the antimicrobial coating being on at least a portion of the first and second doors. The moving of the chips towards at least one of the at least two openings may be via gravity using a slanted floor. The method can further comprise suppressing the growth of bacteria, molds, mildews or fungi with an antimicrobial treatment.

The above-described and other features and advantages of the present disclosure will be appreciated and understood by those skilled in the art from the following detailed description, drawings, and appended claims.

DETAILED DESCRIPTION OF THE INVENTION

Figure 1:
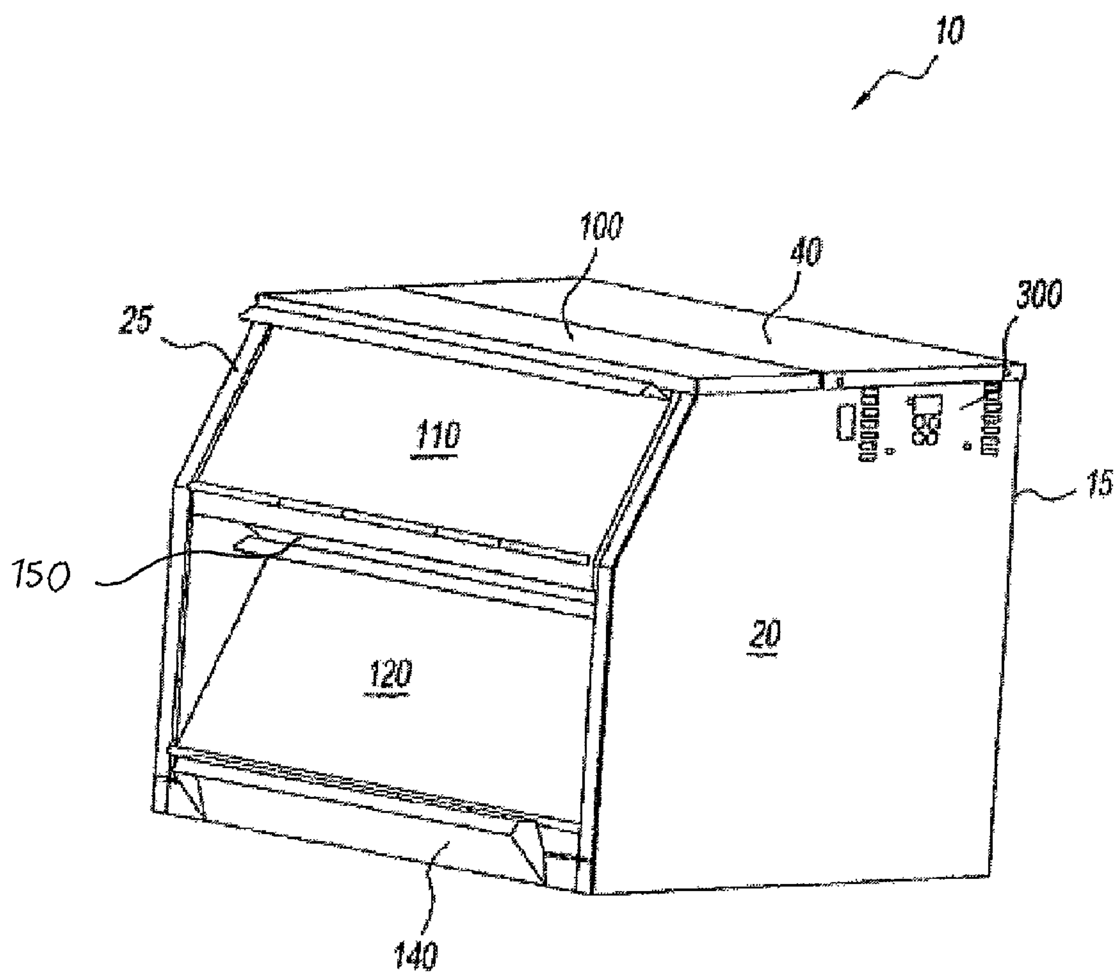
FIG. 1 is a perspective view of an exemplary embodiment of a chip warmer of the present invention.
Figure 2:
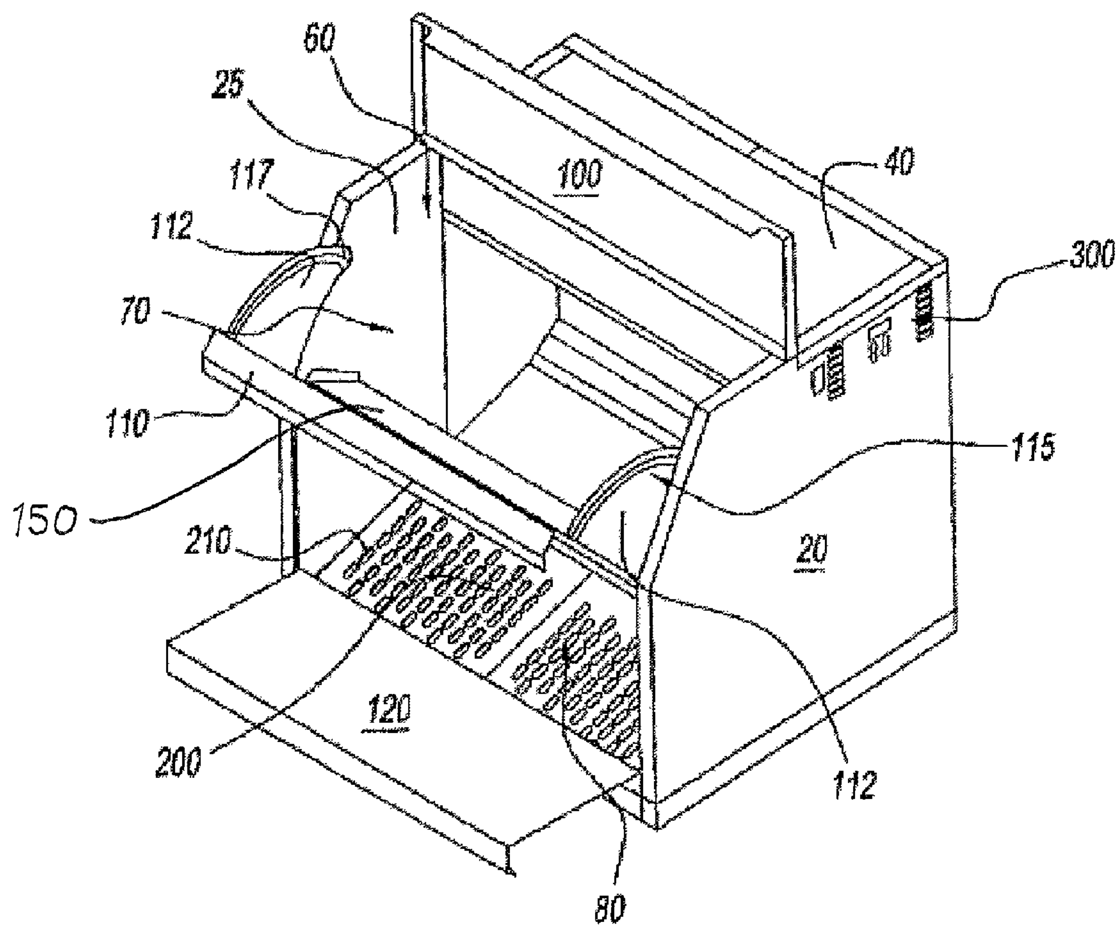
FIG. 2 is the chip warmer of FIG. 1 in an opened position.
Figure 3:
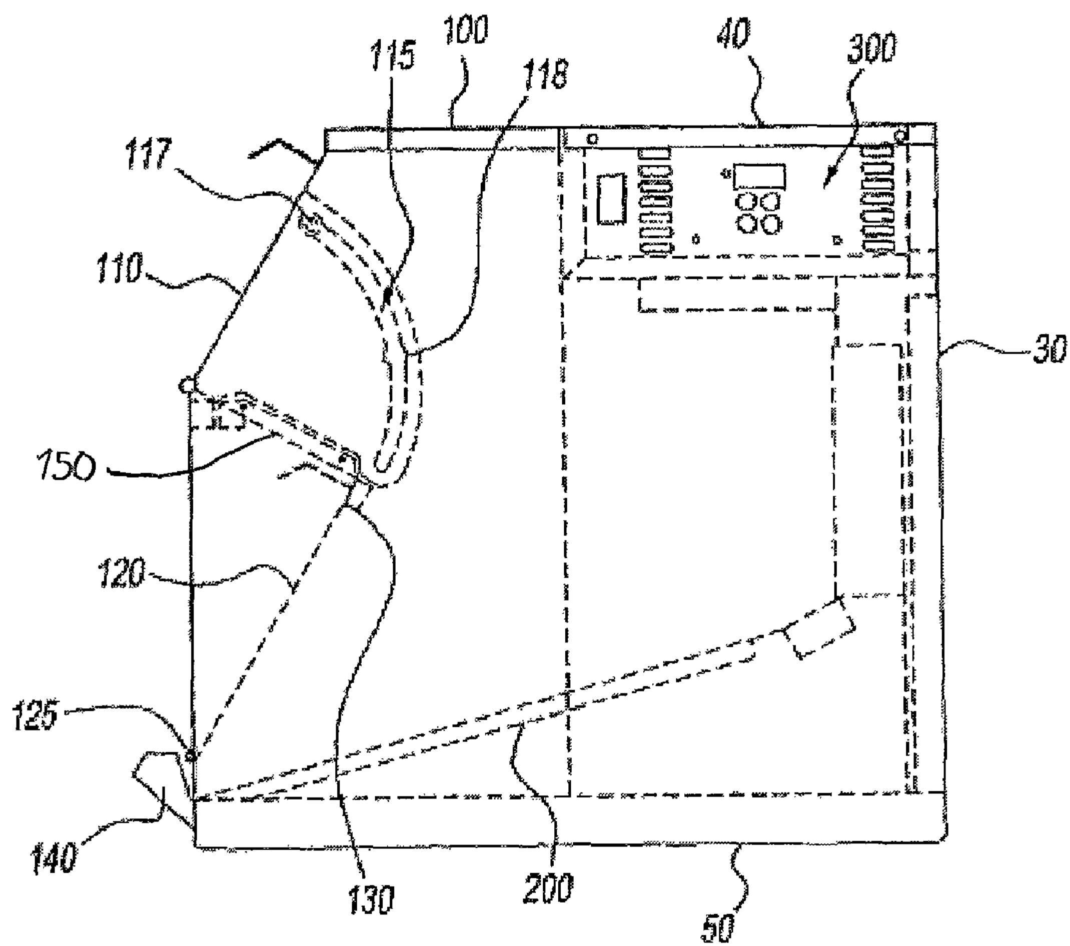
FIG. 3 is a cross-sectional view of the chip warmer of FIG. 1.
Figure 4:
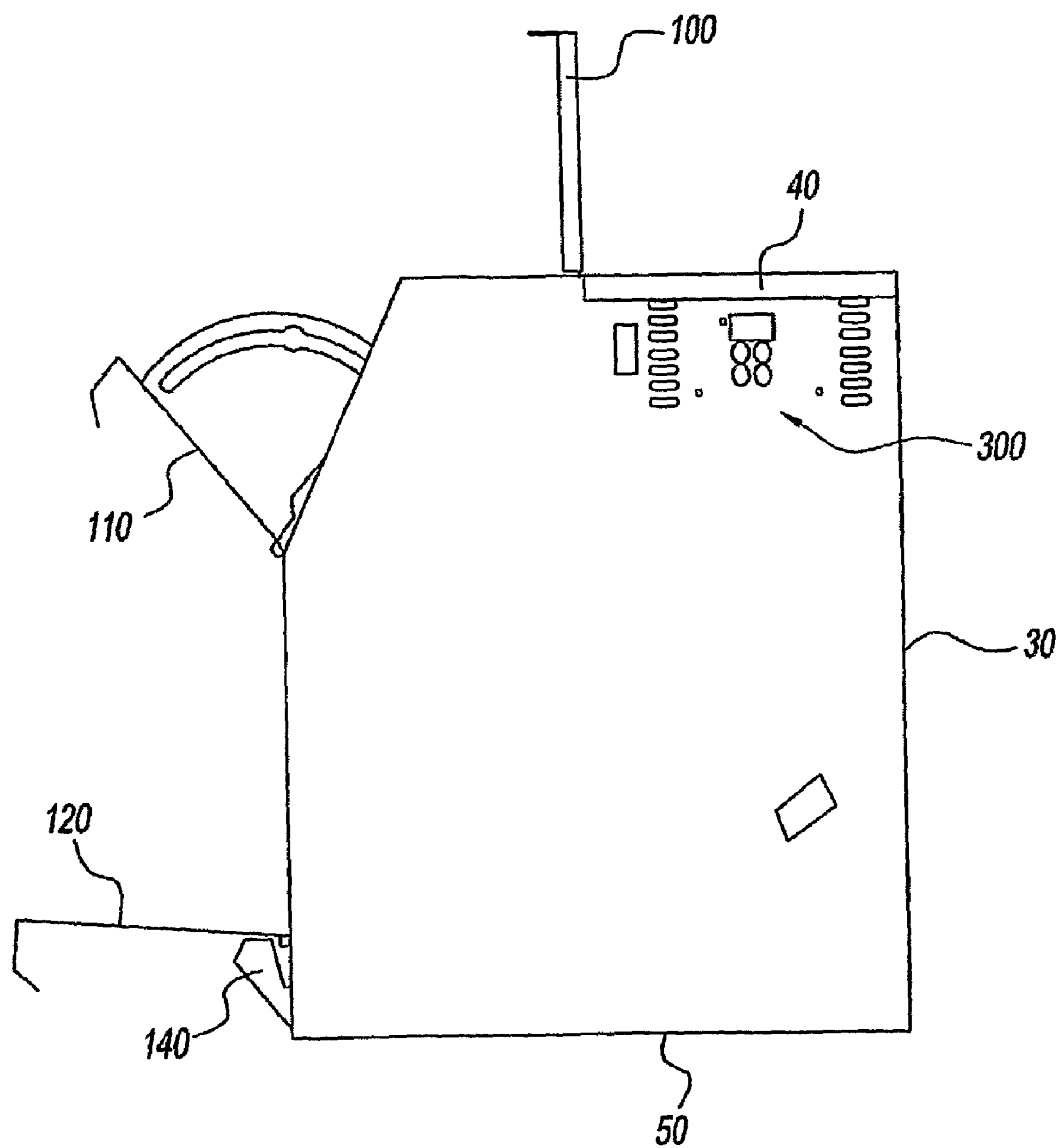
FIG. 4 is a plan view of the chip warmer of FIG. 1 in an opened position.
Figure 5:
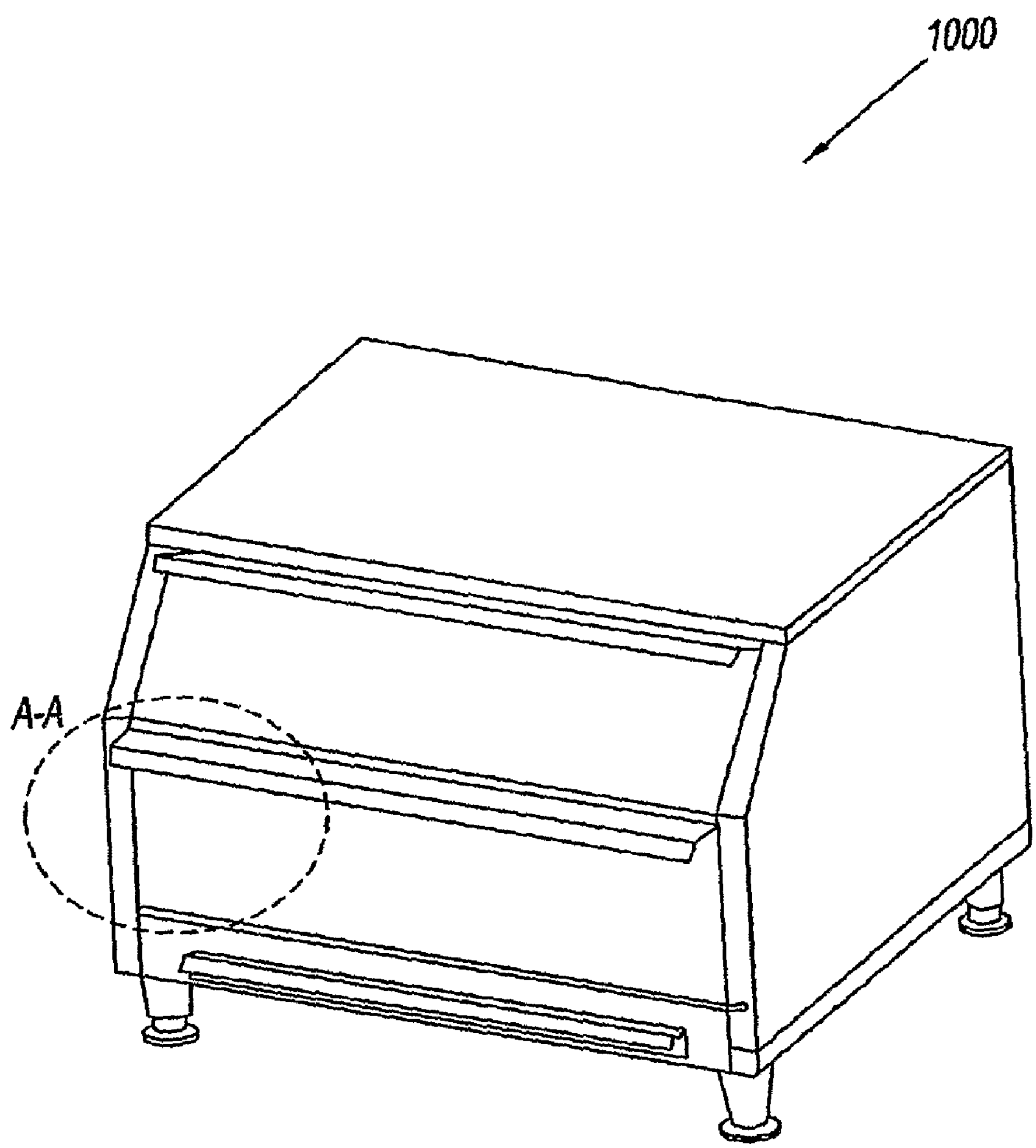
FIG. 5 is a perspective view of another exemplary embodiment of a chip warmer of the present invention.
Figure 7:
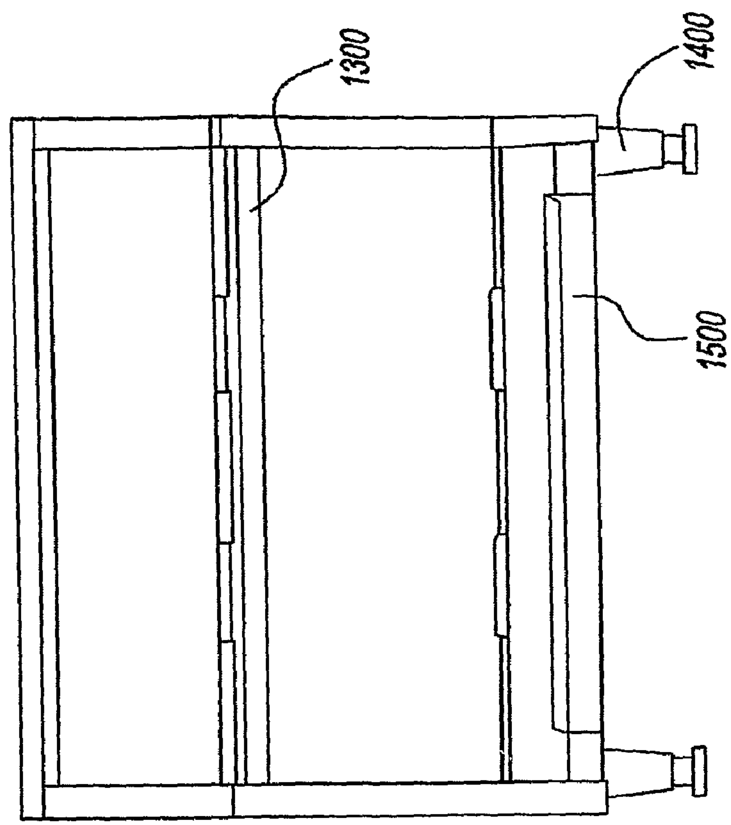
FIG. 7 is a front view of the chip warmer of FIG. 5.
Figure 6:
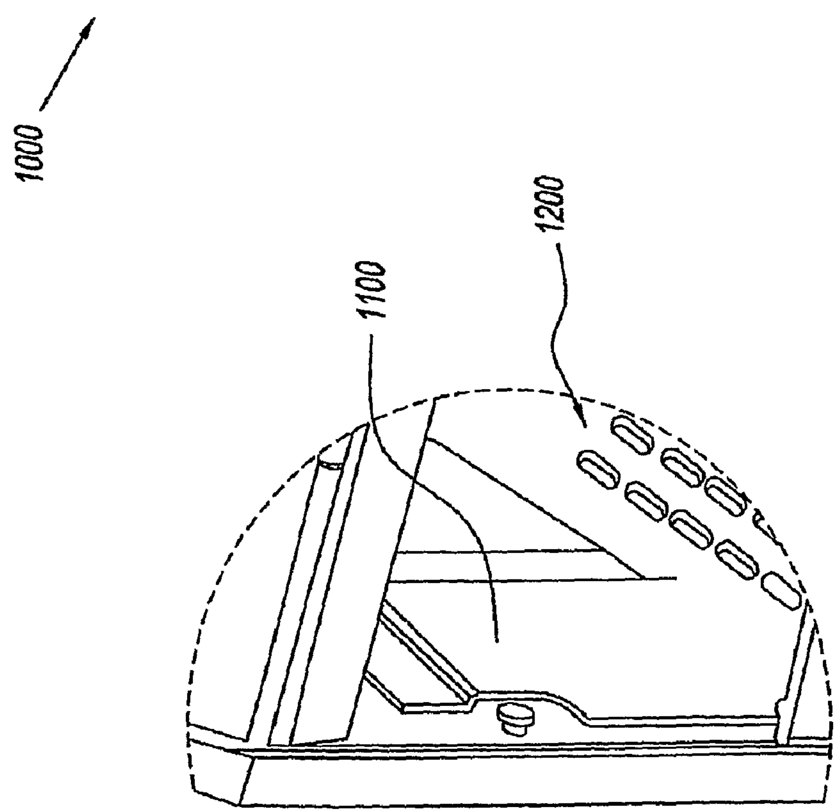
FIG. 6 is portion AA of the chip warmer of FIG. 5.
Figure 9:
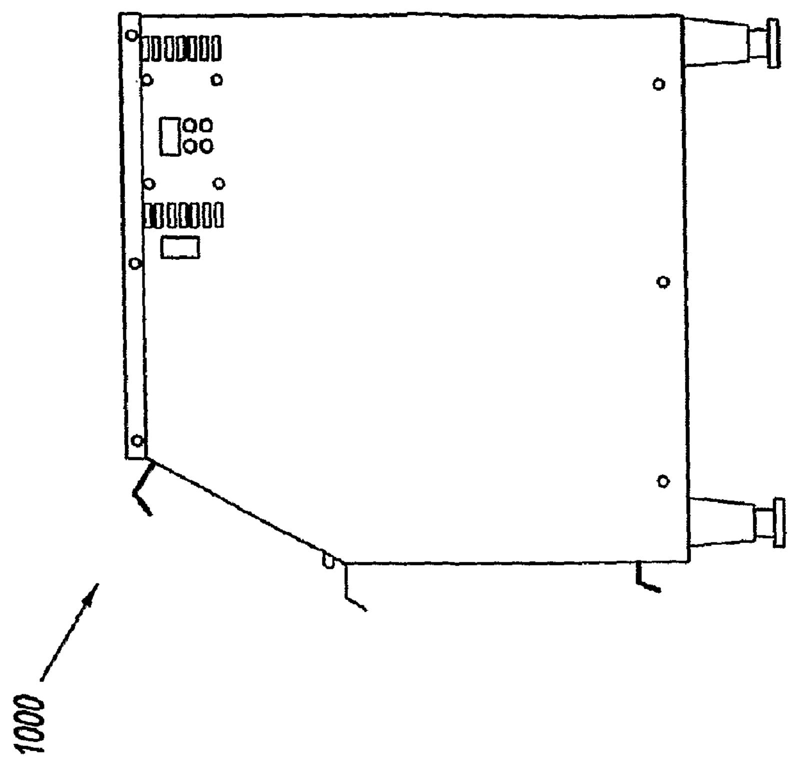
FIG. 9 is a second side view of the chip warmer of FIG. 5.
Figure 8:
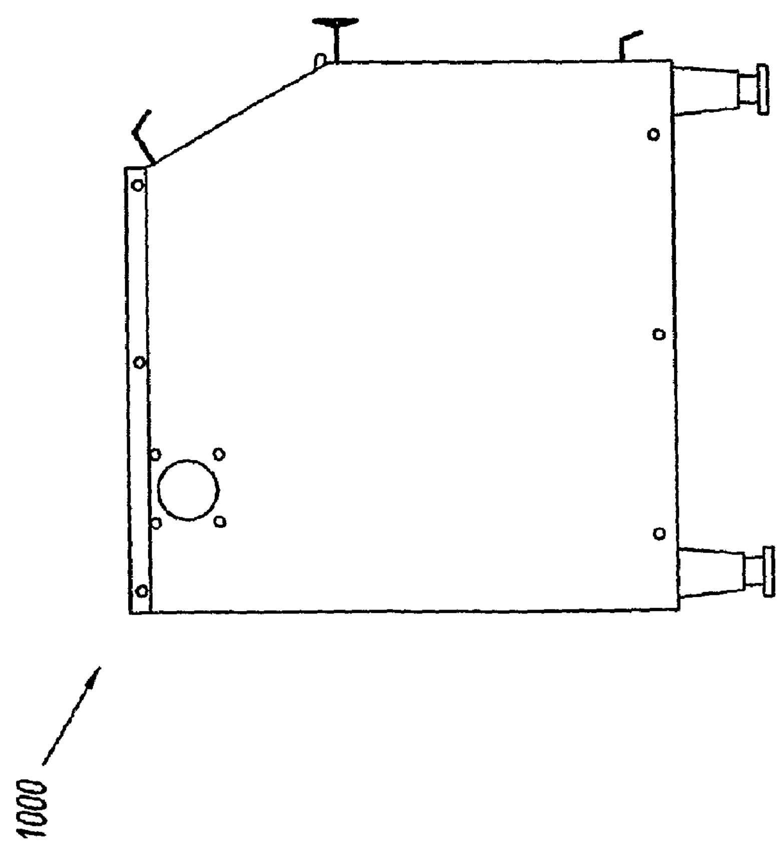
FIG. 8 is a first side view of the chip warmer of FIG. 5.

Referring to FIGS. 1 through 4, an exemplary embodiment of a chip warmer is illustrated and generally referred to by reference numeral 10. Chip warmer 10 has a support structure 15 defined by a plurality of panels or walls. Preferably, the plurality of panels include, but are not limited to, first and second side panels 20 and 25, a rear panel 30, a top panel 40 and a bottom panel or base 50. The plurality of panels are preferably connectable to form support structure 15, such as, for example, screws, snap-fits, and other connection structures or methods. However, the present disclosure contemplates the two or more of the plurality of panels being integrally formed to facilitate assembly of the support structure 15.

First and second side panels 20 and 25, top panel 40 and bottom panel 50 define a plurality of openings 60, 70 and 80. Openings 60, 70 and 80 are selectively sealed or closed by top door 100, front door 110 and chip tray 120, respectively. Preferably, first and second side panels 20 and 25 have an angled corner so that opening 70 is positioned at an angle with respect to openings 60 and 70. The angle of opening 70 allows front door 100 to be held in a closed position without the need for a door holder (e.g. a magnetic catch). Similarly, top door 100 lies flat along the opening 60 and also does not require any door catch.

Openings 60 and 70 are disposed adjacent to each other along the front of the chip warmer 10 to facilitate loading of chips into the warmer. A user can open either or both of the top and front doors 100 and 110 for ease of loading of the chips and depending upon how large of an access to the inside of the warmer is desired. Preferably, the front door 110 has door panels 112 adjacent to and perpendicular with a front portion of the door to prevent chips from falling off the side of the front door portion.

Each of the front door panels 112 has an arcuate shape, and a slot 115 that is in communication with a pivot 117 to allow for pivoting of the front door 110 into opened and closed positions. However, the present disclosure contemplates the use of other structures, pivots, hinges or the like that allow for movement of the front door 110 into opened and closed positions including, but not limited to, tracks for sliding or hinges for swinging. Slot 115 can have openings 118 that allow for removal or adjustment of pivot 117 in the slot 115. Similarly, top door 100 has hinges (not shown) which allow the top door to be pivoted or swung open, although other structures and types of movement are also contemplated for opening and closing of the top door.

Chip tray 120 selectively closes or seals opening 80. The chip tray 120 is preferably pivotally connected to the support structure 15 by a pivot 125. The chip tray 120 interacts with a first stopper 130 on a chip shelf 150 when the chip tray 120 selectively seals the third opening 80. The chip shelf 150 extends in the inner volume of the support structure between the second opening 70 and the third opening 80. The chip shelf 150 also acts as a door-stop for front door 110 at its upper end, shown more clearly in FIG. 3. The chip tray 120 also has a second stopper 140 at its lower end. In a closed position, the chip tray 120 is positioned at an angle from the vertical to eliminate the need for a door catch such as a magnetic catch.

Chip warmer 10 has a floor 200 that is at an angle with respect to the horizontal so as to direct the chips towards opening 80 and the chip tray 120 for removal of the chips. The floor 200 has a plurality of openings 210 therethrough to facilitate the transfer of heat from a heating device (not shown) to the chips. The positioning and configuration of the openings 210 can be varied to facilitate heating of the chips in the warming device 10. The angle of the floor 200 also provides space for positioning of the heating device, although the present disclosure contemplates alternative positionings of the heating device. First and second panels 20 and 25 have cooling openings or louvers 300 formed therein for cooling of selected components of the warming device 10, such as, for example, electronic control components. The positioning and configuration of the cooling openings can be varied to facilitate cooling of the warming device 10.

The present disclosure contemplates chip warmer 10 having various components for the warming or heating of the chips contained therein, having various components for the control of the warming device and employing various methods of heating. The support structure 15 can be made from various materials that facilitates the heating of the chips therein and can include other materials, such as, for example, thermal insulation to increase heat transfer and decrease heat loss.

In another exemplary embodiment of the present invention, a chip warming device has an anti-microbial coating or treatment along at least a portion of the surface of the device. With reference to the support-structure of the embodiment of FIGS. 1 to 4, the anti-microbial coating is preferably along those portions of the warming device that are in contact with the chips, such as, for example, the inner surfaces of first and second side panels 20 and 25, the floor 300, the front door 110 and the chip tray 120, as well as other portions of the warming device that is in contact with the chips. The present disclosure also contemplates covering the entire surface of the warming device with the anti-microbial coating.

The coating or treatment suppresses the growth of bacteria, molds, mildews and fungi. For example, the coating or treatment can be pre-applied to parts of the chip warmer via a solvent-based enamel applied to one or both sides of an aluminum, stainless steel or carbon steel coil. The pre-application process can use a coil coating process, in which the metal surface is cleaned, pre-treated, a clear coating is applied, and the antimicrobial coating is baked onto the metal. The pre-application process provides a uniform coating on the metal surface.

The coating or treatment can also be post-applied to parts of the chip warmer via powder, liquid aerosol spray, air spray, airless spray, brush or roller including aluminum, brass, carbon steel, chrome, copper, cast iron and stainless steel areas. The application method can be chosen by one of ordinary skill in the art depending upon a number of factors including the type of material that is being coated or treated. Additionally, the coating or treatment can be finger-print resistant to improve the aesthetics of the chip warmer.

The coating or treatment is made from low Volatile Organic Chemical (VOC) compounds that retard microbial growth over the useful life of the metal surface of the part. One such low VOC compound antimicrobial coating is SURESHIELD™, which is commercially available from Horizon Business Group.

Referring to FIGS. 5 through 9, another exemplary embodiment of a chip warmer is illustrated and generally referred to by reference numeral 1000. Chip warmer 1000 preferably has a double wall construction with a chip loading hinged top door and a full-length handle. There is also a chip removing hinged bottom door and a full-length handle. The warmer 1000 has a removable door protector 1100 which is preferably side-mounted and a removable chip shelve 1200. The warmer also preferably has a magnetic door latch 1300 and legs or swivel casters 1400. A built-in bottom chip drawer 1500 facilitates cleaning of the warmer 1000. The warmer also preferably has a built-in heat unit with power and temperature controller easily accessible, such as, for example, along an outlet surface of one of the side panels. Various venting configurations can be used along the side panels of the warmer 1000.

Figure 11:
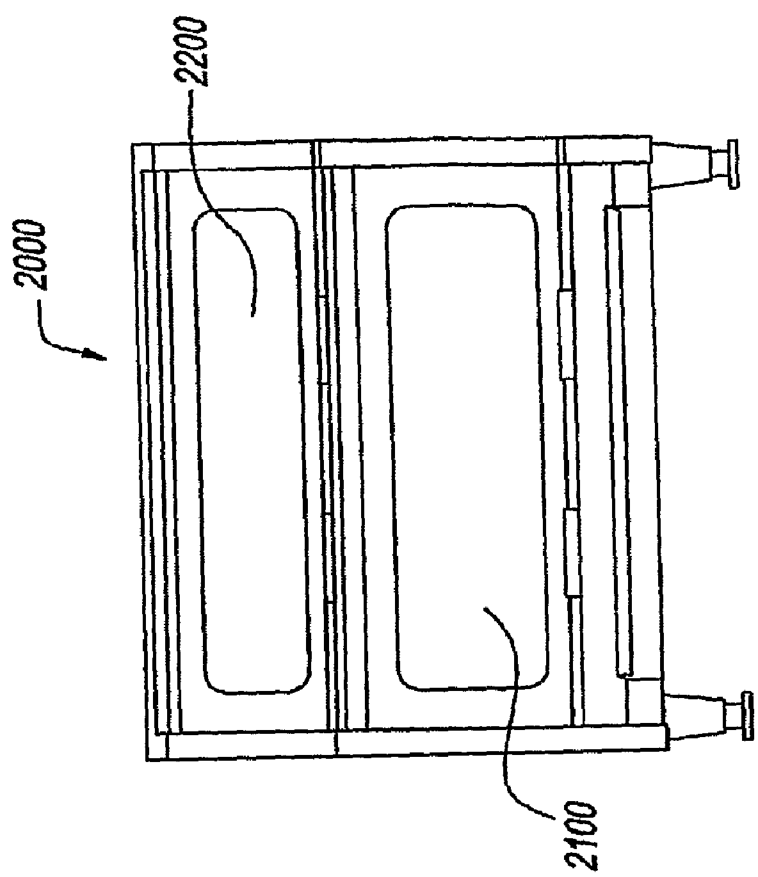
FIG. 11 is a front view of the chip warmer of FIG. 10.
Figure 10:
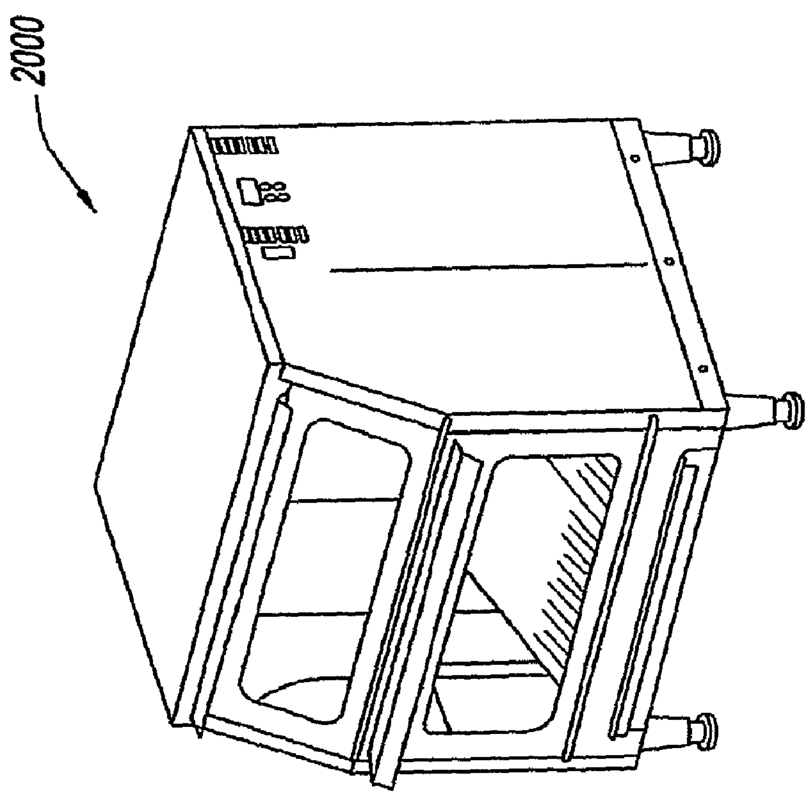
FIG. 10 is a perspective view of yet another exemplary embodiment of a chip warmer of the present invention.

Referring to FIGS. 10 through 11, another exemplary embodiment of a chip warmer is illustrated and generally referred to by reference numeral 2000. Chip warmer 2000 has a first viewing window 2100 and a second viewing window 2200.

It should be understood that the features of the various embodiments shown herein can be interchanged with one another. Also, the anti-microbial treatment can be applied to the viewing window as well as other portions of the warmers 10, 1000, 2000.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A warming device (10, 1000, 2000) for chips comprising:

a support structure (15) defining an inner volume and having a first door (100) selectively sealing a first opening (60), a second door (110) selectively sealing a second opening (70) and a chip tray (120) selectively sealing a third opening (80);

a chip shelf in said inner volume between said second opening (70) and said third opening (80), said chip shelf contacts said chip tray (120) to act as a door-stop (130) for said chip tray (120) when said chip tray (120) selectively seals said third opening (80); and a heating device positioned in said support structure (15) that supplies heat to the chips in said inner volume, wherein said first and second openings (60, 70) are adjacent to each other.

2. The device of claim 1, wherein said second door (110) is rotatably mounted to said support structure (15).

3. The device of claim 2, wherein said second door (110) is at an angle with respect to vertical when in a closed position.

4. The device of claim 1, wherein said chip tray (120) is rotatably mounted to said support structure (15).

5. The device of claim 4, wherein said chip tray (120) is at an angle with respect to vertical when in a closed position.

6. The device of claim 1, wherein said support structure (15) has a floor that is at an angle with respect to horizontal.

7. The device of claim 1, wherein said first door (100) is rotatably mounted to said support structure (15).

8. The device of claim 7, wherein said first door (100) is substantially horizontal when in a closed position.

9. The device of claim 1, further comprising an antimicrobial coating on at least a portion of said support structure (15).

10. The device of claim 9, wherein said antimicrobial coating is positioned along at least one of said first door (100), said second door (110) and said chip tray (120).

11. The device of claim 6, further comprising an antimicrobial coating on at least a portion of said floor of said support structure (15).

12. The device of claim 1, wherein said heating device is positioned in a portion of said support structure (15) remote from said third opening (80).

13. A warming device (10, 1000, 2000) for chips comprising:

a support structure (15) defining an inner volume and having a first door (100) selectively sealing a first opening (60), a second door (110) selectively sealing a second opening (70) and a chip tray (120) selectively sealing a third opening (80); and a heating device positioned in said support structure (15) that supplies heat to the chips in said inner volume, wherein said first and second openings (60, 70) are adjacent to each other, wherein said second door (110) is rotatably mounted to said support structure (15), said second door (110) is at an angle with respect to vertical when in a closed position, and wherein said second door (110) comprises a front panel and side panels (112) that are substantially perpendicular to said front panel, and wherein said side panels (112) are positioned in said inner volume when said second door (110) is in a closed position;

further comprising a chip shelf fixed to the support structure between the second and third openings, the chip shelf extending into the inner volume at an angle to the vertical, wherein the chip shelf contacts the second door to establish the closed position of the second door.

14. The device of claim 13, wherein each of said side panels (112) has a slot (115) formed therein that cooperates with pivots (117) of said support structure (15) for guiding said second door (110).

15. A warming device (10, 1000, 2000) for chips comprising:

a support structure (15) defining an inner volume having a first opening (60), a second opening (70), and a third opening (80), said first opening (60) being formed through a substantially horizontal top of said support structure (15), and said second opening (70) being formed at an angled corner of said support structure (15) so that said second opening (70) is positioned at an angle with respect to and adjacent with said first opening (60);

a first door (100) selectively sealing said first opening (60);

a second door (110) selectively sealing said second opening (70);

a chip tray (120) selectively sealing said third opening (80), said third opening (80) being positioned in a substantially vertical front of said support structure (15) and said chip tray (120) being configured so that, in a closed position, said chip tray (120) is positioned at an angle from substantially vertical;

a chip shelf disposed between the second and third openings and extending into the inner volume, the chip shelf disposed to engage the chip tray when in the closed position; and a heating device positioned in said support structure (15) that supplies heat to the chips in said inner volume.

16. The device of claim 15, wherein said antimicrobial coating is on at least a portion of one or more of said chip tray (120), said first door (100), and said second door (110).

* * * * *